Figure 2:
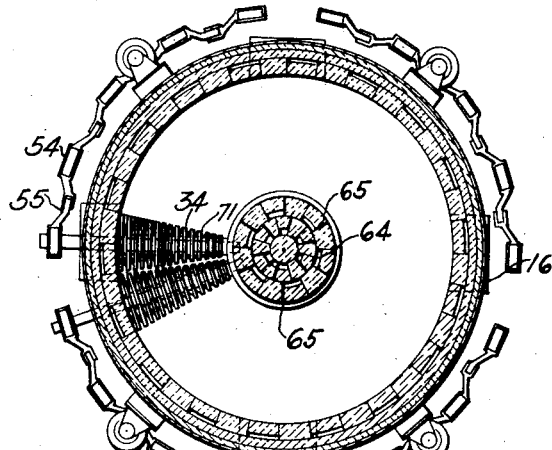

Dec. 12, 1933.   F. W. STEERE   1,939,471
APPARATUS FOR PRODUCING COMBUSTIBLE GAS
Filed April 20, 1928   2 Sheets-Sheet 1

FRANK W. STEERE
INVENTOR

BY
his ATTORNEY

Dec. 12, 1933.  F. W. STEERE  1,939,471
APPARATUS FOR PRODUCING COMBUSTIBLE GAS
Filed April 20, 1928   2 Sheets-Sheet 2
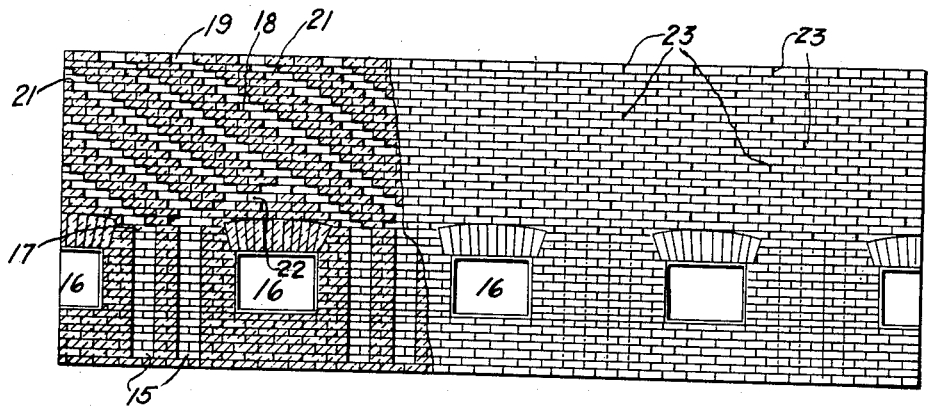
Fig_3_
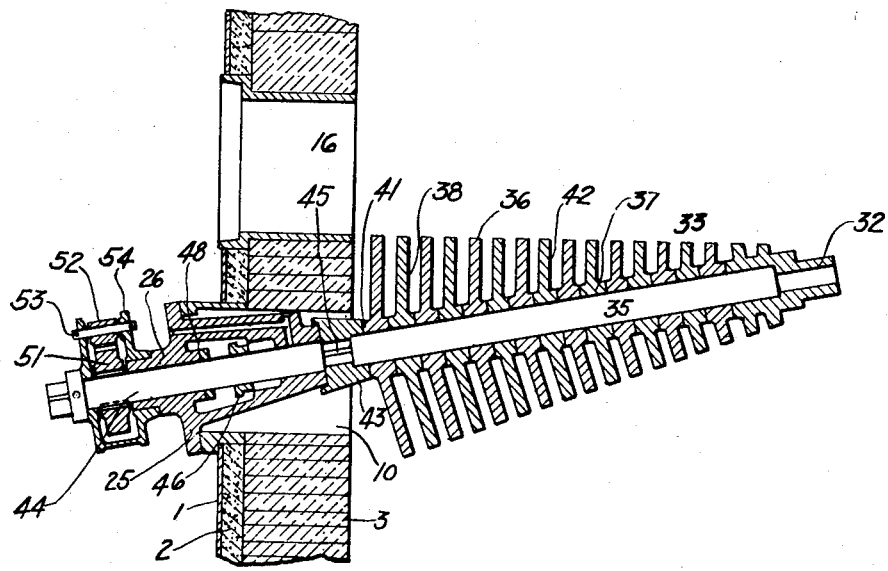
Fig_4_
FRANK W. STEERE
INVENTOR
BY James B. L. Orme
ATTORNEY Patented Dec. 12, 1933

1,939,471

UNITED STATES PATENT OFFICE 1,939,471

APPARATUS FOR PRODUCING COMBUSTIBLE GAS

Frank W. Steere, Scarsdale, N. Y., assignor to Semet-Solvay Engineering Corporation, New York, N. Y., a corporation of New York Application April 20, 1928. Serial No. 271,466

2 Claims. (Cl. 48—64)

This invention relates to a process and apparatus for producing combustible gas, and more particularly to a process and apparaus for producing combustible gas in a gas generator wherein clinker formation is retarded and reduced, and means are provided for breaking up and removing the clinker and ash formed in the fuel bed. Although I have shown and described herein as an embodiment of my invention a generator for water gas manufacture, it will be understood that this invention is not limited thereto but may be used in connection with other gas generating devices as for example, in producer gas operation.

It has been found in the usual operation of water gas generators, that clinker builds up contiguous to and along the side walls of the generator frequently forming a hard and solid cake on the walls of the machine. In addition to the side wall clinker, there usually is a gradual formation of clinker throughout the fuel bed. It is therefore necessary, at more or less frequent intervals, to remove ash and clinker from the fuel bed. In the case of clinkers, this is done by manually removing them from the bed by means of a suitable tool. Immediately after clinkerng the fuel bed is of substantially uniform density but during the subsequent operations clinkers gradually build up in the fuel bed until it is necessary to again remove them. Due to this gradual formation of clinkers, the density of the fuel bed varies, thereby altering the conditions of gas manufacture and rendering the accurate control of the gas-make difficult. Further, this periodic clinkering, in addition to the arduous task involved, necessitates the discontinuance of the gas making operation thus effectively decreasing the capacity of the set.

One object of the present invention is to simplify the operation of gas generating devices by retarding and preventing the formation of clinkers in the fuel bed, and removing ash and clinker from the fuel bed, thereby maintaining substantially uniform fuel bed conditions and a fuel bed of uniform density. The reduction of clinker formation in the fuel bed eliminates, to a large extent, the necessity for manually removing clinker thus increasing the life of the refractory lining of the generator. Also, the elimination of the necessity for periodically discontinuing the gas making operation to remove clinker permits continuous and automatic operation and thereby increases the efficiency and capacity of the gas making set.

According to a preferred embodiment of the present invention, there is provided a refractory lining for the generator, having flues therein, the flues extending from the ash pit of the generator along the side walls thereof, and being in communication with the ash pit and with the fuel bed. The generator has therein a grate for suporting the fuel bed which comprises members mounted about the longitudinal axis of the cylindrical casing of the generator to provide a circular opening. Preferably, the structure of the grate is of the type disclosed in my copending application filed November 15, 1927, Serial No. 233,471. A pier built up of refractory material so as to provide longitudinal channels extending from substantially the top to the base of the pier and passages or flues connecting these channels with the exterior thereof contiguous to the fuel bed is positioned on the grate and extends into substantially the central portion of the fuel bed. During the blasting and gas making operation, the air and/or steam introduced into the ash pit passes through the grate and pier into the fuel bed and also through the flues of the refractory lining into the fuel bed.

The steam and/or air in passing through the flues in the lining and pier into the fuel bed acts as a cooling medium therefor thereby retarding and preventing the formation of clinker contiguous thereto. The flues of the lining and pier communicate with the fuel bed in the generator at spaced points on the interior circumferential surface of the lining and exterior surface of the pier, so that the air and/or steam emerging from the flues provide a multiplicity of jets which augment the action of the cooling medium in retarding and preventing the formation of clinkers. Also, the fluid passing through the lining and pier and emerging therefrom into the fuel bed tends to prevent the firm adherence to the lining and pier of clinkers formed therein so that the agitation of the fuel bed by the grate is sufficient to cause the clinker to gradually settle on the grate which crushes and removes it from the fuel bed. The grate is preferably moved to continuously agitate the fuel bed and automatically and continuously remove the ash and clinker therefrom.

This invention accordingly comprises a combustible gas generator having a fixed member extending from a rotatable grate therein into substantially the central portion of the fuel bed supported by the grate.

Figure 1:
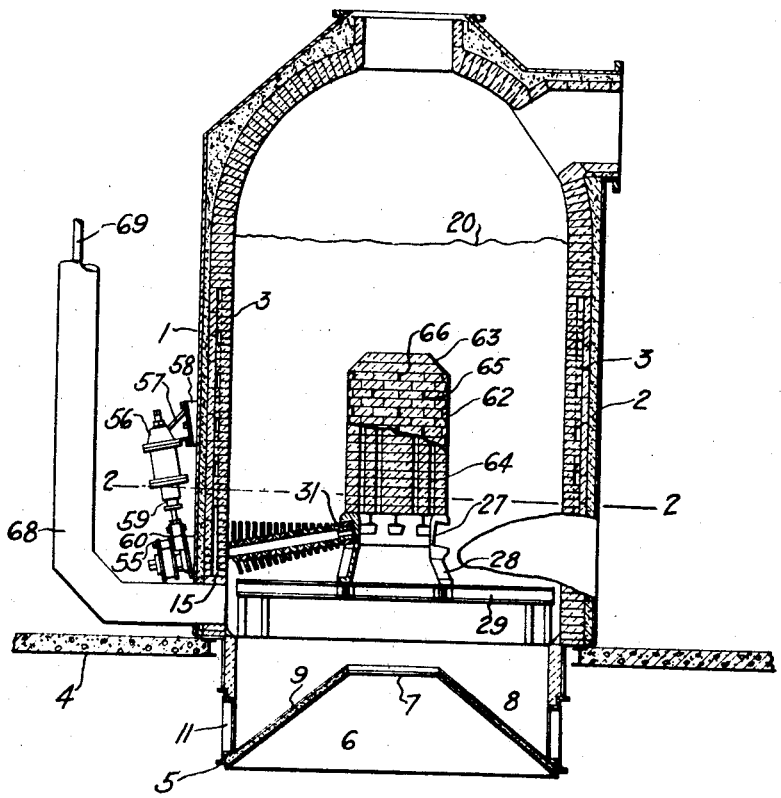

Other objects and advantages will appear from the following detailed description taken in connection with the accompanying drawings in which Fig. 1 shows a preferred embodiment of the invention applied to a gas generator. This figure is a vertical side elevation, broken away to show the interior construction of the generator and the pier therein; Fig. 2 is a sectional plan view, partly in elevation, taken on the line 2—2 of Fig. 1; Fig. 3 is a vertical longitudinal view of the portion of the lining formed with flues as that portion would appear if positioned in a vertical plane, the right-hand side of this figure showing the lining contiguous to the fuel bed and the left-hand side being broken away to show the arrangement of the flues therein; and Fig. 4 is a fragmentary sectional detail on an enlarged scale, showing the mounting for a section of the grate.

In the preferred embodiment of the invention illustrated on the drawings, 1 indicates a cylindrical shell or casing of a water gas generator lined with suitable insulating material 2, and provided with a refractory lining 3. The generator is supported on a cement or other suitable base 4, and preferably extends below the base 4, the lower extremity 5 being connected by an inverted truncated conical plate 6, with a ring 7 forming an ash pit 8. Plate 6 is provided with a refractory lining 9. Doors 11 are positioned in the ash pit and whenever desired may be opened and the ash pit cleaned.

The refractory lining 3 for the generator is preferably composed of fire brick and is so constructed that a pair of vertical flues 15 are positioned between the adjacent clinker door openings 16 extending at regularly spaced positions through the lining 3. The base portions of the flues 15 preferably are communicably connected with the ash pit 8. The vertical flues 15 terminate at 17 slightly above the openings 16, and have extending therefrom oblique flues 18 which end at points 19 below but preferably near the top of the fuel bed, indicated generally by the reference numeral 20. Oblique flues 21 are formed substantially parallel to the flues 18 and extend from above the openings 16 to points 19 similarly located below the top of the fuel bed. Flues or connecting passages 22 are also formed in the lining and connect the flues 21 with the upper ends 17 of the vertical flues 15. Flues 18, 21 and 22 communicate at spaced points 23 on the interior circumferential surface of the lining with the fuel bed in the generator.

Openings 10 spaced about the circumferential surface of the generator extend through the heat insulating lining 2 and the casing 1 and have mounted therein castings 25 (Fig. 4) which are provided with cylindrical bearings 26. Mounted preferably co-axially with the longitudinal axis of the casing 1 is an open casting 27 bolted or otherwise secured to an inclined casting 28 resting on I beams 29 which serve to support the casting 28 in fixed position. Casting 27 is positioned on casting 28 to form bearing surfaces 31 at regularly spaced points around the outer periphery of these castings.

Rotatably mounted in the bearing surfaces 31 are the bearing pins 32 integral with or secured to the vertices of the truncated conical roll sections 33 of the grate 34. Each conical roll section comprises a rectangular or flattened shaft 35 (Fig. 4) which has slidably mounted thereon, preferably at regular spaced positions, polygonal plates or discs 36, provided with circular thickened portions 37. These discs are dished as indicated at 38 and are of gradually diminishing surface area, the plate of greatest area being positioned at the end 41 of shaft 35, adjacent the interior periphery of the refractory lining 3 while the disc with the smallest surface area is positioned adjacent the casting 27. This construction provides a grate comprising a plurality of grate sections, each having the general configuration of a conical roll provided with a plurality of annular slots or recesses 42.

Bearing members 43 are rotatably positioned in openings 10 contiguous to the casting 25. The flattened shafts 35 are mounted in the bearing members 43 and are preferably welded thereto. Shafts or rods 44 are rotatably mounted in the casting 25 and have the ends 45 flattened or rectangular in form and in driving engagement with the rectangular opening of the bearing member 43. Suitable packing and glands 46 are positioned on shafts 44 to provide a dustproof bearing support for the shafts 44, and collars 48 are keyed or otherwise secured to the shaft 44 to maintain this structure in operative relation, and permit the removal of the grate section by allowing the withdrawal of the end 45 of the shaft 44 from the bearing 43. Shafts 44 extend exteriorly of the casing 1 and keyed or otherwise secured to shafts 44 are ratchets 51 which are in driving engagement with pawls 52 pivotally mounted on pins 53, passing through disc shaped portions 54 of toggle levers 55.

Hydraulic cylinders or motors 56 are preferably secured to the exterior of the casing 1 by bracket arms 57 bolted or otherwise secured to standards 58. Piston rods 59 of the hydraulic cylinders are directly or indirectly connected by links 60 with the toggle levers 55, so that back and forth movement of the piston rods oscillates the toggle levers and through the pawls 52 and ratchets 51 secured to shafts 44 intermittently rotates the conical roll sections of the grate. It is understood, of course, that the mechanism herein described for moving the conical roll sections of the grate is illustrative in character and that any desired drive may be employed.

Positioned above the casting 27 over the opening defined by the vertices of the conical roll sections of the grate, and preferably built up from fire brick, is a cylindrical pier member 62. This pier is preferably formed with a truncated cone shaped top portion 63 and with longitudinal channels 64 disposed at spaced positions radially of the axis of the pier parallel thereto. The axis of the pier is preferably in alignment with the longitudinal axis of the generator. The longitudinal channels 64 communicate with the base portion of pier 62 and extend substantially the length of the pier. Transverse passages or flues 65 are provided which communicate with the longitudinal passages 64 and the exterior circumferential surface of the pier, thus connecting the longitudinal passages with the fuel bed contiguous to the pier.

Leading to the base of the generator, preferably below the grate into the ash pit 8, is a blast pipe 68 for supplying air or other oxygen containing gases during the blasting cycle. A pipe or jet 69 extends into the air blast pipe 68 and is used to supply steam or other fluid for the gas making cycle. It is understood, of course, that the showing of steam and air pipes is merely illustrative in character and that the steam and/or air may be supplied in any desired manner to any desired portion of the generator but preferably it is supplied to the ash pit of the generator.

In operation the piston rods 59 of the hydraulic cylinders 56 are reciprocated at regular intervals by the admission and discharge of a suitable pressure fluid into and through the hydraulic cylinders, thereby oscillating the links 60 and advancing the pawls 52 which are in engagement with the teeth of the ratchet wheels thereby intermittently rotating the ratchets and correspondingly moving the shafts 44 of the conical roll sections 33 in driving engagement therewith. The adjacent conical roll sections 33 of the grate are mounted so that the disc members 36 are positioned with the flat peripheral edges 71 of one grate section in crushing relation with the edges of the discs of the adjacently located sections.

The provision of the pier extending up from the grate into substantially the central portion of the fuel bed disposes the fuel in an annular column between the outer circumferential surface of the pier and the inner surface of the lining, increasing the effective grate surface of the generator permitting the distribution of the steam and/or air throughout the fuel bed thereby retarding the formation of clinkers therein and preventing the firm adherence of clinker to the walls of the lining or contiguous to the exterior surface of the pier. The rotating conical roll sections 33 function to agitate the fuel bed and cause the clinker to settle thereon and also grind the clinker and cause the clinker and ash to travel between the rolls and through the recesses 42 into the ash pit 8.

During the blasting cycle, air or other oxygen containing gases is introduced through the pipe 68 into the ash pit and a portion of the gas passes therefrom through the grate into the fuel bed, the remaining gas passing through the longitudinal passages and flues of the pier and through the flues of the lining into the fuel bed, emerging therefrom through the openings 23, and 66 into the sides of the fuel bed. During the gas making cycle, steam or other gas making fluid introduced through pipe 69 enters the ash pit and similarly passes through the grate and flues of the pier and lining into the base and side portions of the fuel bed. Thus, there are formed jets of steam and/or air emerging at spaced points on the interior circumferential surface of the lining and from the exterior surface of the pier which act to retard and prevent the formation of clinker in the fuel bed. The combined action of the gas cooled lining, grate and pier is to retard the formation of clinkers in the fuel bed, prevent the firm adherence of the clinker to the lining or the walls of the pier, agitate the fuel bed to cause the clinker to settle on the grate, and grind and remove clinkers formed in the fuel bed so that a fuel bed of uniform density is obtained.

It will be noted that the conical rolls converge from the inner periphery of the casing towards the longitudinal axis thereof and are arranged to define a circular opening having its center on the longitudinal axis of the casing. The pier, preferably, has its longitudinal axis in alignment with the longitudinal axis of the casing. While the pier is shown cylindrical in contour and a circular opening is shown in the casting 27, it will be understood that this construction and design of pier and casting is merely a preferred embodiment and that the opening in the casting and the cross-sectional contour of the pier may be of any desired configuration.

It will also be noted that this invention provides efficient means for retarding and preventing the formation of clinker in the fuel bed and for automatically and continuously removing ash and clinker formed therein, thereby eliminating the necessity for discontinuing the gas making operation to remove clinker from the fuel bed, and enabling continuous operation with consequent increase in the capacity of the set. The elimination of the necessity for manually removing clinker serves to increase the effective life of the lining for the generator, as it prevents destruction of the lining by the tools heretofore used in removing clinker therefrom. The gentle agitation of the fuel bed by the grate and the operation of the lining and pier to retard and prevent the formation of clinker therein provides a fuel bed of relatively uniform density, thereby maintaining uniform fuel bed conditions throughout the operation of the generator and increasing the thermal efficiency of the gas making apparatus.

When in the specification and claims reference is made to the introduction of "steam and air" into the pier or into the fuel bed, it will be understood that the steam and air are not necessarily introduced at one and the same time but that air and/or steam may be introduced depending on the particular method employed for operating the gas generator and on the particular type of combustible gas which it is desired to make.

While I have shown and described as a preferred embodiment of my invention a process and apparatus wherein the gas making fluid from a single source is admitted simultaneously through the grate, pier and lining to the fuel bed, it is understood that my invention is not limited thereto and that the fluid passing through the lining may be supplied from one source and the fluid passing through the grate and pier or through only the pier from another source, and that one fluid may be passed through the lining into the fuel bed of the generator while a different fluid is passed through the grate or pier into the fuel bed. Also, this invention includes the passage of the gas making fluid through the lining or through the pier into the fuel bed during only a portion of the cycle of operation of the generator.

It will, of course, be understood that while a specific embodiment of the invention has been shown and described herein, various changes in the details thereof may be made by those skilled in the art and the invention is not to be limited to the structure described but only by the scope of the appended claims.

I claim:

1. In a combustible gas generator, a grate adapted to support a fuel bed comprising members positioned around the inner periphery of said generator converging towards the longitudinal axis thereof and disposed to provide an opening, a pier positioned over said opening and extending into said fuel bed and a refractory lining for said generator having flues therein, said flues comprising vertical portions extending from below to above the grate and oblique portions extending from the top end of the vertical portions through the lining, the oblique portions of the flues communicating with the fuel bed and the vertical portions communicating with the generator below the grate.

2. In a combustible gas generator, a grate adapted to support a fuel bed, members positioned around the inner periphery of said generator converging towards the longitudinal axis thereof and disposed to provide an opening, a refractory lining for said generator having flues therein, said flues comprising vertical portions extending from below to above the grate and oblique portions extending from the top end of the vertical portions through the lining, the oblique portions of the flues communicating with the fuel bed and the vertical portions communicating with the generator below the grate, and a pier positioned over said opening and extending into said fuel bed, said pier being built up of refractory material so that the longitudinal channels and passages communicating with said channels and said fuel bed are provided therein.

FRANK W. STEERE.